United States Patent [19]

Buckelew

[11] Patent Number: 5,022,493

[45] Date of Patent: Jun. 11, 1991

[54] METHOD AND APPARATUS FOR LUBRICATING CABLES

[76] Inventor: William E. Buckelew, 546 Manchester Ct., Piscataway, N.J. 08854

[21] Appl. No.: 528,222

[22] Filed: May 24, 1990

[51] Int. Cl.$^5$ .............................................. F16N 7/00
[52] U.S. Cl. ...................................... 184/16; 15/256.6
[58] Field of Search ...................... 184/15.1, 16, 102; 15/256.6; 401/10, 11

[56] References Cited

U.S. PATENT DOCUMENTS

| | | | |
|---|---|---|---|
| 1,809,492 | 6/1931 | Rowland et al. | 184/102 |
| 2,604,650 | 7/1952 | Mottelson | 184/16 |
| 3,783,972 | 1/1974 | Molstad | 184/15.1 |
| 4,749,059 | 6/1988 | Jonnes et al. | 184/15.1 |
| 4,891,037 | 1/1990 | Maples | 184/15.1 |

*Primary Examiner*—Ira S. Lazarus
*Assistant Examiner*—Alan B. Cariaso
*Attorney, Agent, or Firm*—Robert K. Tendler

[57] ABSTRACT

A dispenser for use in applying soap or other lubricants to wires to be pulled through conduits includes a slotted resilient canister capable of accommodating different size wires in a central bore, with the canister being filled with lubricant-retaining spronge-like material. The canister slot is adapted to receive a sponge-like and soap-filled insert which is placed in the longitudinal slot, with the slot providing access for the wires to the central bore. In one embodiment, all spong-like materials are packaged within apertured bags, thereby to prevent spillage while permitting the lubrication or soaping of wires or cables inserted into the central bore of the canister through the slot, with 360 degree lubrication being achieved through squeezing of the canister about the wire as it is pulled through the canister. One embodiment includes a rotatable canister cover or sleeve to lock the insertable piece to the resilient container. In a further embodiment, sponge-like material is provided in a bag which is impervious to the lubricant but has one or more apertures in one surface. With the sponge-like material fully-laden with lubricant, the bag is manually wrapped around the cable with the aperture facing inwardly, and lubricant is manually squeezed from the sponge-like material onto the surface of the cable as the cable is pushed through the wrap around bag.

14 Claims, 10 Drawing Sheets

METHOD AND APPARATUS FOR LUBRICATING CABLES

FIELD OF THE INVENTION

This invention relates to a method and apparatus for the feeding or pulling of wires through a conduit and more particularly to a container for a drip-free 360 degree lubrication of wires to be pulled through the conduits.

BACKGROUND OF THE INVENTION

Wire pulling lubricants, or so-called "soaps", are used in the electrical industry for insulated wires pulled through a conduit by means of a drag wire, iron snake, rope or steel cable which is connected to a pulling winch, either manual or power driven. In most cases, the iron snake, drag wire or rope is pulled by hand, using only the power of an individual.

Conduit systems vary in sizes from ½ inch to and through 5 inches, with the conduits running anywhere from, for instance, 10 feet to 300 feet and in some cases up to 500 feet. The wire or cable that is used is pulled through these conduits either singularly or plurally and varies in size from 14 gauge to 750 gauge, with 14 gauge being the smallest normally utilized and with 750 gauge being the largest normally utilized. The wires are pulled through these conduit systems or pipes such that the inserted wire runs in different combinations of numbers and sizes from one or two conductors up to 400 conductors in typical usage.

In the past, the passage of the wire through the conduit has been facilitated through the utilization of a lubricant or soap which is available, in one embodiment, as Ideal Yellow 77 Wire Pulling Lubricant, catalogue number 31-351, from Ideal Industries, Inc. of Sycamore, Illinois. The practice which has long been the case is to either dip the wire into a pail of lubricant or to grab some lubricant with one hand and apply the lubricant with both hands to the cables to be routed, while at the same time pushing the cables through the conduit at the open end of the conduit. It should be noted that electrical wires are made of either copper or aluminum, and that lubricant usually never touches the wire. Rather, the lubricant is utilized over the insulation for the wire, there being many types of insultations, all of which are listed in the National Electrical Code Book. The lubricants are used mainly to reduce friction caused by insulated wire being pulled through a conduit system. Because of the friction exerted by the wire insulation during wire pulls, there a concomitant strain on the insulation. Using the lubricants which produce less strain means that there is less chance of an insulation breakdown after the wire is pulled and the electrical current is introduced. If there is a breakdown caused by excessive strain, it will be appreciated that there is a chance of a blowout in the cable's insulation. Thus, lubricating the wire prior to insertion not only reduces friction, it also reduces strain and therefore saves, to a certain extent, the insulation from breakage.

A third factor in utilizing lubricant is the labor saving factor. Because there is less friction when the soap is used, the wire moves at a faster rate with relative ease to avoid snags and to provide for easy passage through bends in the conduit. Of course, there being less friction, there is less drag which results in less strain on pulling equipment which saves on wear and tear of the equipment. By utilization of a lubricant, the number of bends that can be accommodated in a conduit run are increased so that the restriction on the number of conduit bends is lessened through the utilization of lubrication. Finally, when multiple wires are pulled through a conduit, there is less space for the wires to be pulled through. If a lubricant is not used, it makes future pulls through the virtually impossible conduit even if a successful multiple wire pull is initially provided.

Thus, the lubricant cuts down on friction on the insulation, cuts down on the strain of insulation, saves time and labor, saves wear and tear on equipment, eases the restriction caused by the number of bends in the conduit run and eases the difficulty of pulls involving multiple cables.

The aforementioned manual techniques of applying lubricants have been in use for at least 80 years and the usual steps involved are as follows: The mechanic or electrician inserts a bare hand into the lubricant bucket which is located some distance away from the mechanic. The mechanic applies the lubricant or soap on the wire. Soaps usually do not cling together or to the wires so there is invariably a mess of material which drips from the wire resulting in a large cleanup procedure after the wire pulling procedure. In order for a wire pull to be successful, there must be at least two men, one to pull and the other to soap and feed. There is also a problem since the mechanic feeding has soap all over his hands which means that he loses his grip and leverage to be able to both soap and push the wire up through the conduit. This can make a very easy pull difficult because the mechanic feeding the wire has no critical ability to put frictional contact to the outside jacket of the wire; and, therefore he is unable to push the wire from his end.

As mentioned above, whenever a soap or lubricant is used, there is usually a cleanup factor which becomes a labor factor. This is important because it deters some mechanics or electricians from utilizing the lubricant. However, not using the lubricant risks future problems with the wire running or pulling.

SUMMARY OF THE INVENTION

Unlike prior art in which a messy and difficult lubricating process has been in place for a number of years, the subject method includes the utilization of a resilient canister having within it the lubricant which is squeezed onto conductors as they pass through a central bore in the canister. The canister is initially mounted to the wires by providing a longitudinal slot which is then sealed with a longitudinal insert that is locked in place after wire has been inserted into the central bore. The device soaps the conductors in 360 degrees and guarantees that the wires are amply lubricated. In one embodiment, the subject system is leak-free because the soap is sealed in open cellular sponge-like members by plastic bags which surround the sponge-like members. Here the plastic bag is conformed by a sponge inside the bag so as not to lose its shape. The portion of the bag near the central bore or longitudinal axis of the canister is apertured to permit the lubricant to pass from the sponge-like material onto the wire, with the bags being sealed for shelf life with tear away or pull away tabs to expose the lubricant for use. These tabs, in one embodiment, can be reinstalled so that the canisters may be stored for the next pull. The plastic bags act as a seal at the top and bottom of the canister in order to contain the lubricant. The sponge in the bag allows for adjustment to different combinations and numbers of insulated wires giving an automatic adjustment range.

Thus, the dispensing canister, in effect, is clamped around the wire it at the beginning of the wire or at the middle of the wire so that it allows the wires to be placed in the direct center of the pull. A removable lubricant dispensing section, the longitudinal insert, that seals and unseals the inner lubricant section may be utilized as the aforementioned tab so that the canister may, in one embodiment, be reusable while at the same time permitting the insertion of the wire into the canister through the slot with the removable dispensing section. In one embodiment, a rotating inner cam which squeezes the lubricant from the sponge within the plastic bag extrudes the lubricant onto the wire insulation.

In another embodiment, the cam is eliminated and the lubricant is merely extruded onto the wires carried through the internal portion by means of providing that the canister itself be resilient. As mentioned before, the sponges are filled with lubricant inside a plastic bag to reduce or eliminate spillage or dripping, thereby eliminating the amount of cleanup necessary when utilizing the subject system.

Importantly, the wire extending from the lubricating canister before it is lubricated provides a outer jacket which is unsoaped or unlubricated to permit the person doing the lubricating to grip the unsoaped wire and simultaneously push the wire through the canister and up through the conduit while, at the same time, squeezing the container with his other hand thereby applying the lubricant. Thus, the electrician or mechanic at the insertion point can contribute to a pushing of the wire through the conduit because he can grab a portion of the wire or conduit which is unlubricated.

In summary, a dispenser for use in applying soap or other lubricants to wires to be pulled through conduits includes a slotted resilient canister capable of accommodating different size wires in a central bore, with the canister being filled about the central bore with lubricant-retaining sponge-like material. The canister slot is adapted to receive a sponge-like and soap-filled insert which is placed in the longitudinal slot such that an interior surface thereof communicates with the central bore. In one embodiment, all sponge-like materials are packaged within apertured bags, the reby to prevent spillage while permitting the lubrication or soaping of wires or cables inserted into the central bore of the canister through the slot, with 360 degree lubrication being achieved through squeezing of the canister about the wire as it is pulled through the canister. Thus, messy hand lubrication from a bucket is eliminated. Moreover, the portion of the wire prior to being pushed through the container, provides for a nonslippery surface to permit pushing or threading the soap-covered wire through the conduit; there being no drip or spilled materials, no insulation damage, the ability to lubricate from the center of a wire as opposed to an end, and a reusable container. One embodiment includes a rotatable canister cover or sleeve to lock the insertable piece to the resilient container. A further embodiment includes iris-type end pieces for the container so as to accommodate different numbers and sizes of wires or cables.

BRIEF DESCRIPTION OF THE DRAWINGS

These and other features of the subject invention are better understood in connection with the Detailed Description taken in conjunction with the Drawings of which.

DETAILED DESCRIPTION

Figure 1:
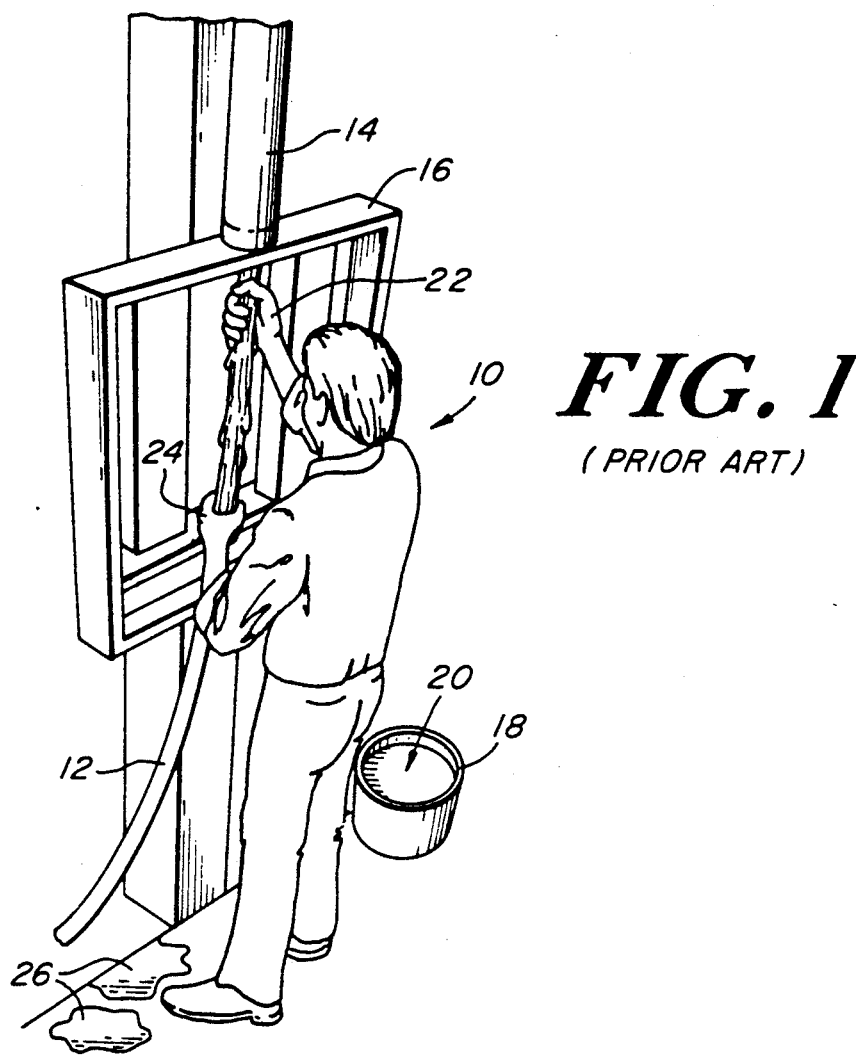
FIG. 1 is a diagrammatic view of a prior art method of lubricating cables prior to their being pulled through a conduit.

Referring now to FIG. 1, in the prior art, an individual 10 responsible for feeding cables 12 through a conduit 14 at a junction box 16 lubricates cables 12 by hand through dipping one or both hands into a soaping or lubricant bucket 18 containing a lubricant 20 commonly known as "soap". With double hand lubrication and a top hand 22 providing the lubrication with the bottom hand 24 attempting to move the cable 12 upwardly, this depicts a very difficult and messy operation, with individual 10 providing very little, if any, force on cable 12 to move it upwardly through conduit 14. The result, even after a successful cable pull, is a considerable amount of spillage 26 on the floor surrounding the pull, which necessitates a tremendous amount of clean up and, which in the past has discouraged mechanics or electricians from the utilization of lubricants.

Figure 2:
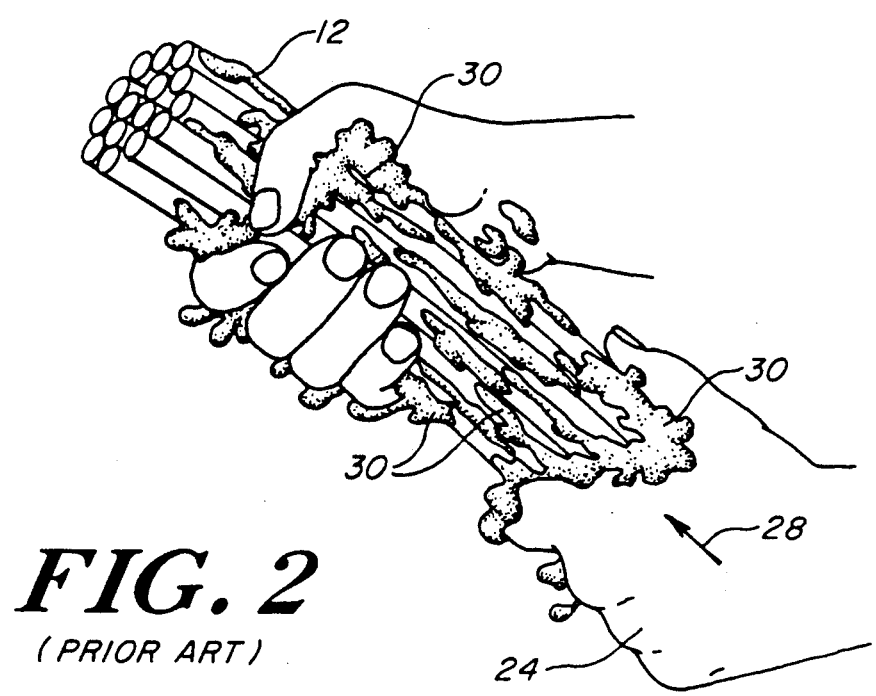
FIG. 2 is a diagrammatic representation of the manual application of lubricant to a number of wire cables indicating that the amount of force appliable to the cables a the point of lubrication is minimal.

Referring to FIG. 2, with bottom hand 24 used for pushing cables 12 in the direction of arrow 28, it can be seen that the amount of gripping force on the cables is minimal due to the lubricant here illustrated at 30, such that the amount of help that the person doing the lubricating can provide is minimal at best due to the slippery nature of the lubricant utilized. Thus, the machinery and individuals at the other end of the pull (not shown) are given the majority of the job of pulling the wires through the conduit.

Figure 3:
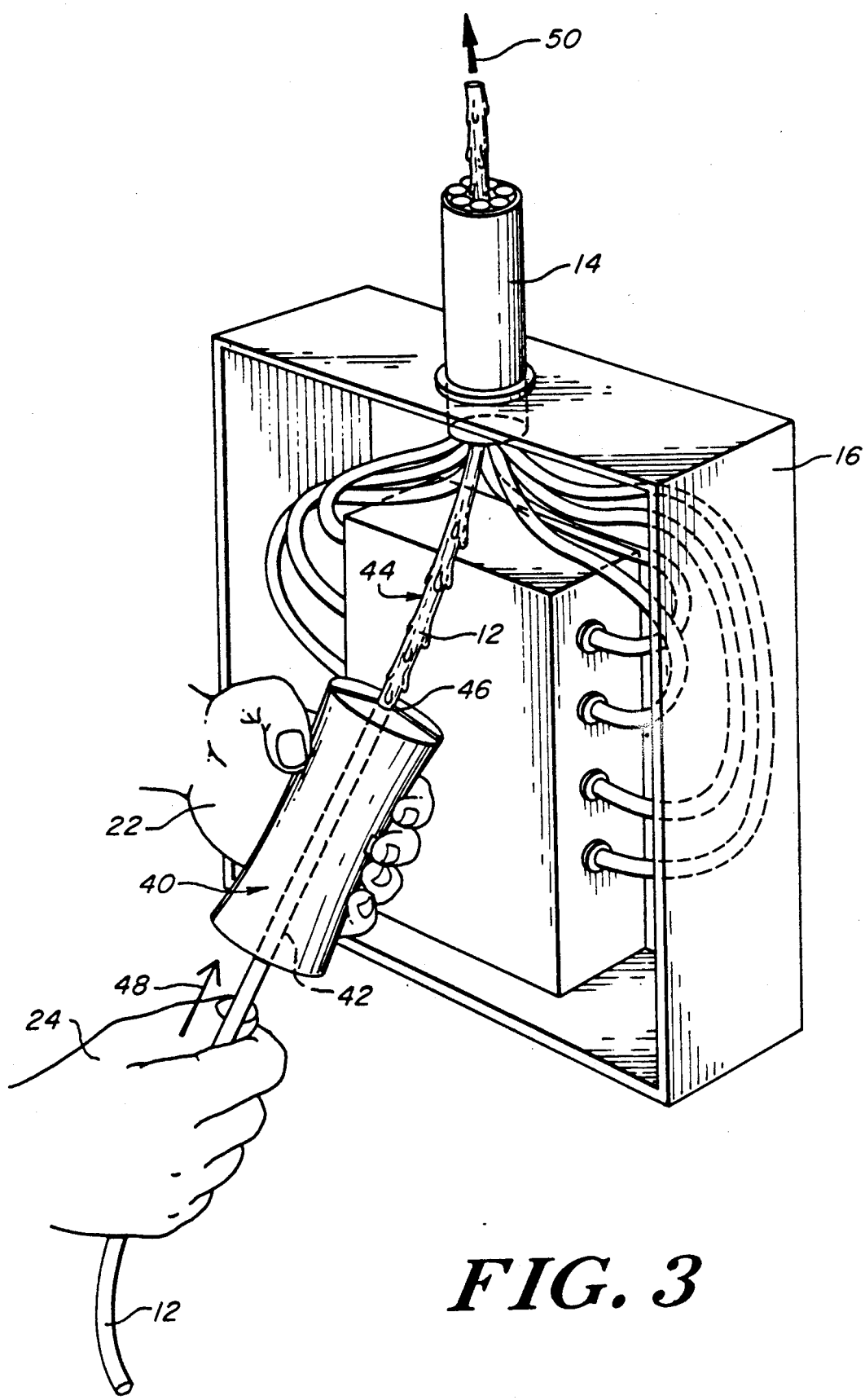
FIG. 3 is a diagrammatic representation of the subject resilient canister illustrating the passage of cables through the central bore of the canister, also illustrating the lubrication in 360 degrees of the cables extending from the canister, as well as the pushing of the cables through the canister and up through the conduit.

In contradistinction to such a manual operation and referring now to FIG. 3, a resilient container 40 is placed about cable 12 such that cable 12 runs through a central bore of canister 40 here illustrated by dotted lines 42. It will be seen that hand 22 is utilized to squeeze canister 40, in one embodiment, so as to permit the lubricant contained therein to be squeezed onto cable 12 such that lubricant as illustrated at 44 completely surrounds the cable as it exits canister 40 at exit orifice 46.

It can be seen that the lower hand, hand 24, can grasp onto the jacket of the wire 12 prior to its being lubricated such that an upward force as illustrated arrow 48 is applied to the cable prior to its entry into canister 40, thereby to provide an upward force illustrated by arrow 50 for the lubricated cable.

The canister, whether reusable or not, provides spillage-free lubrication of the cables passing there through in 360 degrees with a reliability greater than that of the aforementioned manual method of applying the lubricant.

Moreover, the individual feeding the conductors through the conduit can provide a certain amount of force to the cable to feed the cable through the conduit due to the grasping of unlubricated portion of the cable prior to its passage through the canister.

In one embodiment, the canister is resilient so that lubricant contained within the canister within sponge-like material is forced out of the sponge-like material and onto the surface of the conductor or cable passing through the canister.

Figure 4:
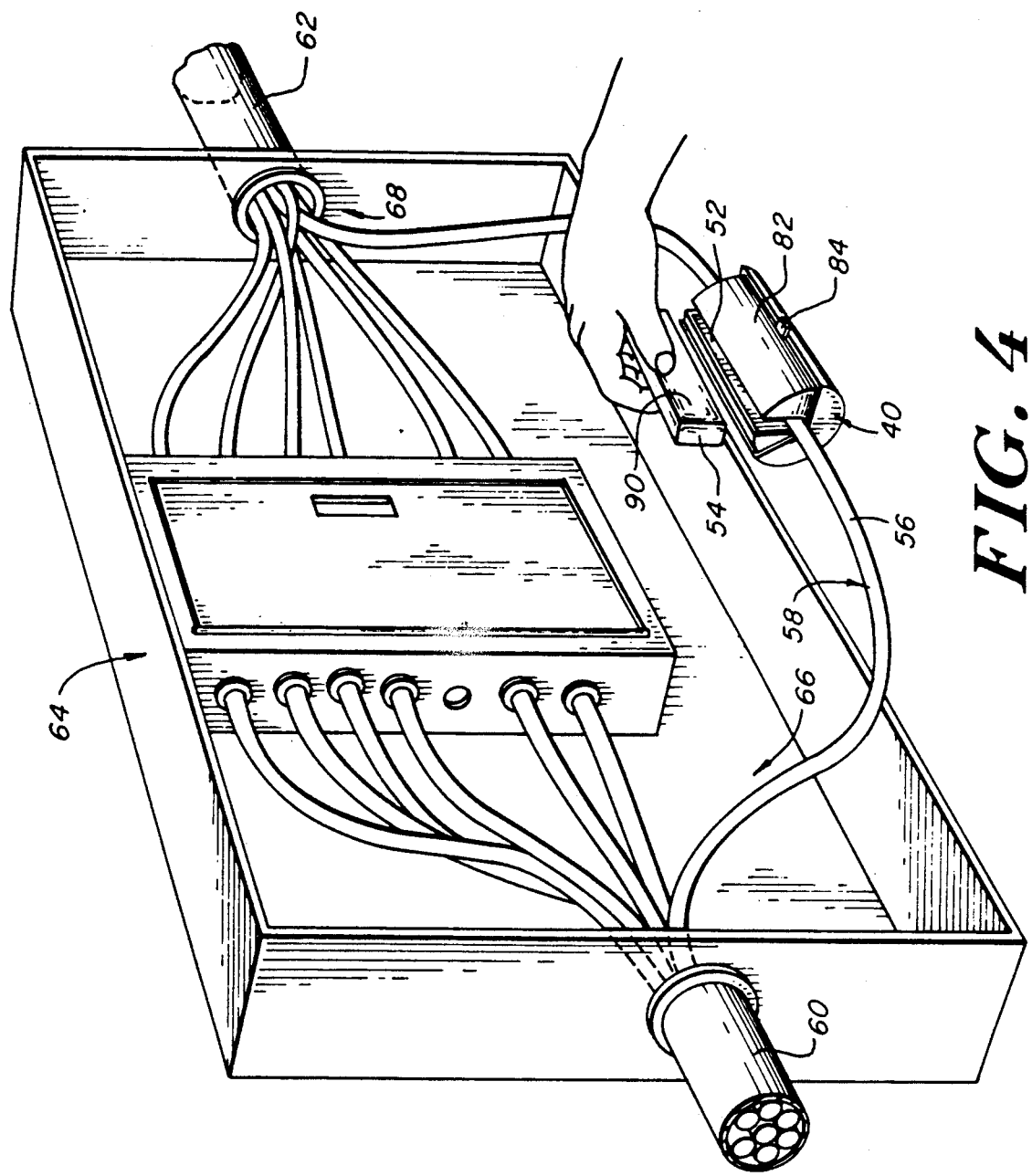
FIG. 4 is a diagrammatic illustration of the utilization of the subject canister for lubricating the wires in a wire pull, in which the canister is located at an intermediate section of the wire or cables to be pulled.

While an end of the cable may be passed through the canister without the opening of the canister, referring to FIG. 4, the canister 40 may be provided with a longitudinal slot 52 into which an insertable piece or member 54 may be located after an intermediate portion 56 of a cable generally illustrated at 58 is inserted into the central bore of the canister. This permits the feeding of wires which are continuous from one conduit, for instance, conduit 60 to and through another conduit, here conduit 62, without severing the cable. The ability to locate the subject device anywhere along the cable is convenient for the type of application illustrated in FIG. 4 in which a connection box 64 may be provided with a cable which is forced, as shown by arrow 66, into conduit 60 whereas it is to be forced into conduit 62 as illustrated by arrow 68. Thus, a conduit can be soaped intermediate its ends by the utilization of a canister which has a central bore and the ability to surround the cable through the utilization of a longitudinally running slot.

Figure 5:
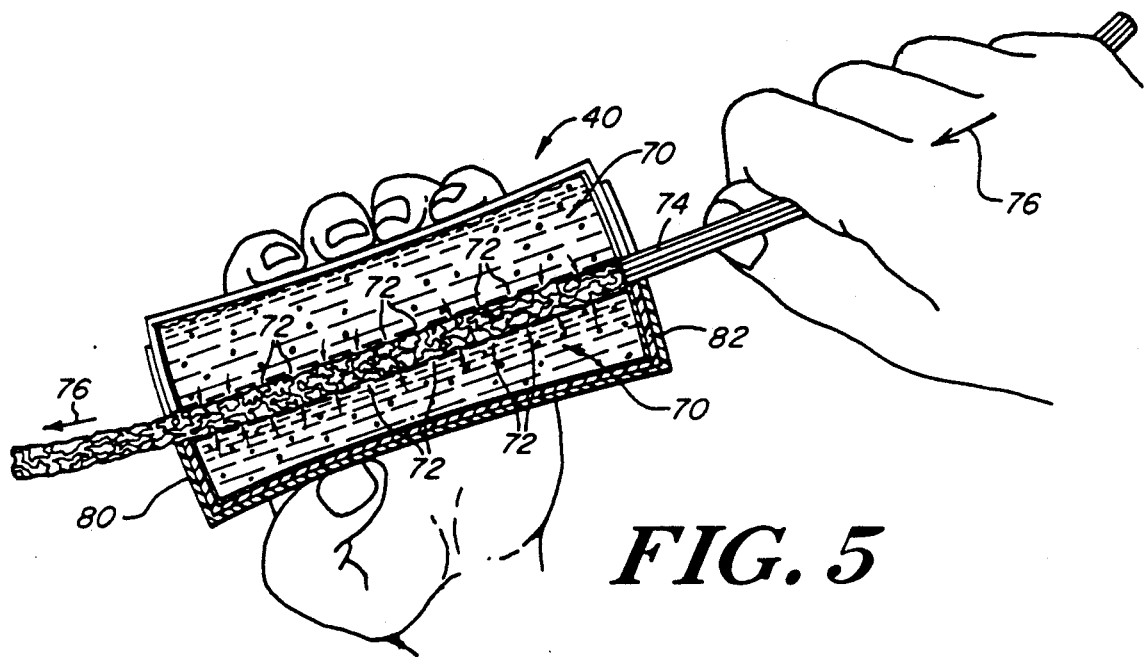
FIG. 5 is a diagrammatic and partial cross-sectional illustration of the 360 degree application of lubricant to cables passing through the central bore of the subject canister illustrating that the force which can be applied along the longitudinal axis of the cable is larger by far than the amount of force which can be applied manually to lubricated cables.

Referring to FIG. 5, it can be seen that, in one embodiment, the resilient canister 40 contains sponge-like material 70 throughout its body which is impregnated with suitable lubricant. Apertures 72 in plastic bags 73 which surround the sponge-like material are placed along the central bore of the container to permit the flow of lubricant onto the inserted cable 74 as the cable is pushed in the direction of arrow 76 via manual manipulation. Here it can be seen that the canister has an outer shell sleeve 80 and a rotatable inner shell or sleeve 82 which, as illustrated in FIGS. 4 and 6–11 can be utilized to lock the insert 54 into place by rotation of handle 84 of FIG. 4.

Figure 6:
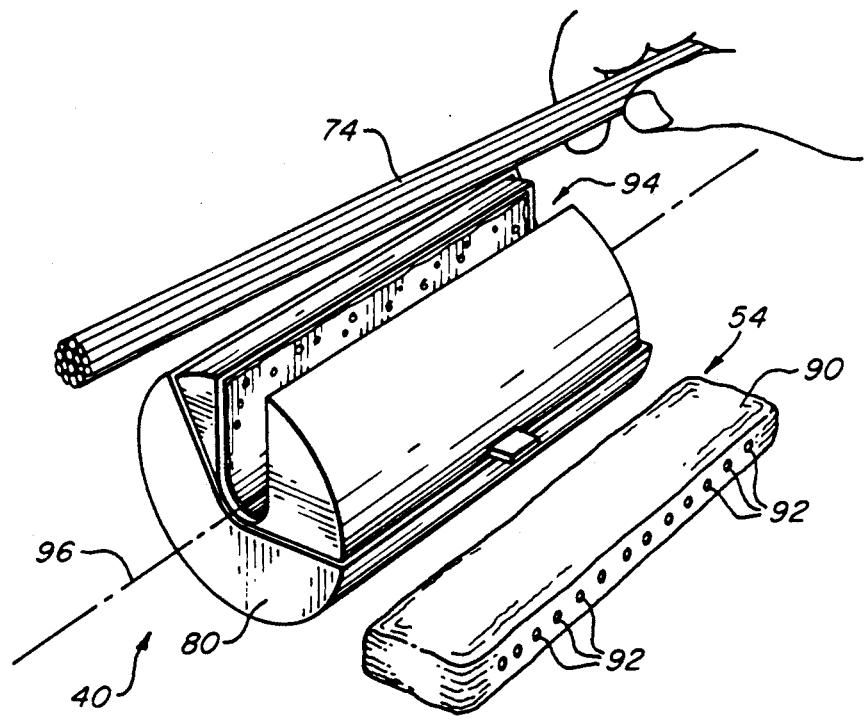
FIG. 6 is a diagrammatic illustration of the utilization of a longitudinal slot in the subject canister which shows the placement of the cables through the slot and into the central bore of the canister as well as the utilization of a longitudinal insertable lubricating member.

As described above, within the canister is the aforementioned cellular sponge-like material which, in one embodiment, is surrounded by plastic envelopes which have apertures only along the central bore of the canister. As will be seen in connection with FIGS. 6, 7, 10 and 11, the insert is wrapped in a plastic bag or material 90 as illustrated in FIG. 4 which, as illustrated in FIG. 6, has apertures 92. When member 54 is inserted into a slot 94 in canister 40, the insert protrudes into a central bore which lies along centerline 96. The remainder of the sponge-like material lies in a specialized plastic bag 88 which is cylindrical except for a longitudinally-running slot.

Figure 7:
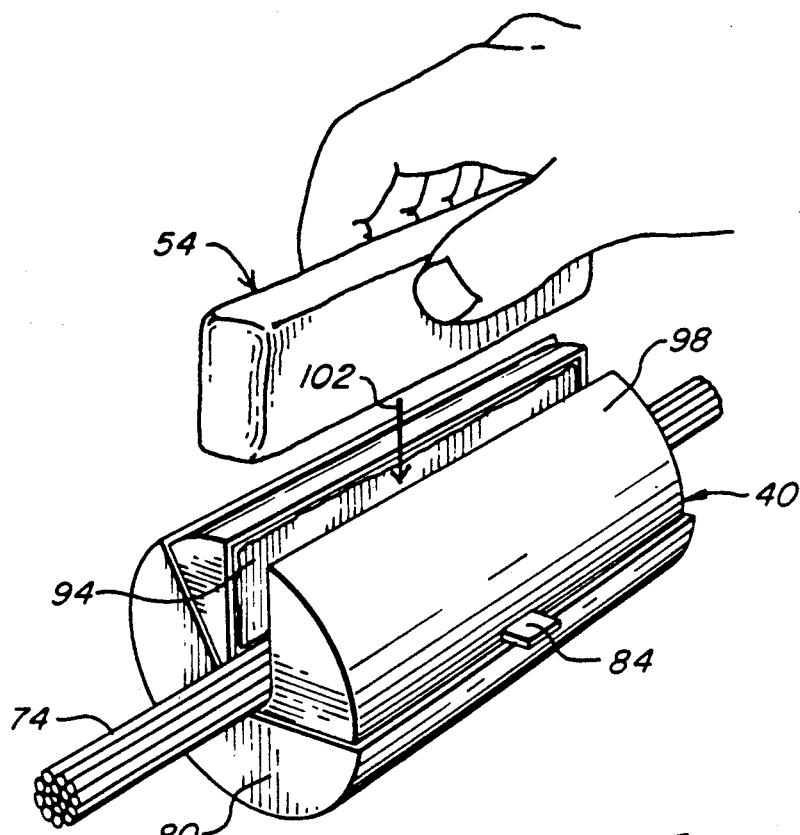
FIG. 7 is a diagrammatic illustration of the canister of FIG. 6 with the wires in place in the cen.pa tral bore, showing the insertion of the insertable member through the aforementioned slot.

Note that cable 74 is inserted into slot 94 as illustrated in FIG. 7 so as to come to rest within the central bore of the canister. Here the insertion of member 54 can be seen prior to the rotation of a slotted inner sleeve 98 within canister body 80 via movement of handle 84 after the inserted piece is inserted as illustrated by arrow 102 into slot 94. Note that inner sleeve 98 is slotted and carries the majority of the sponge-like material, which is likewise slotted, with both the material and the slot rotating with rotation of inner sleeve 98.

Figure 8:
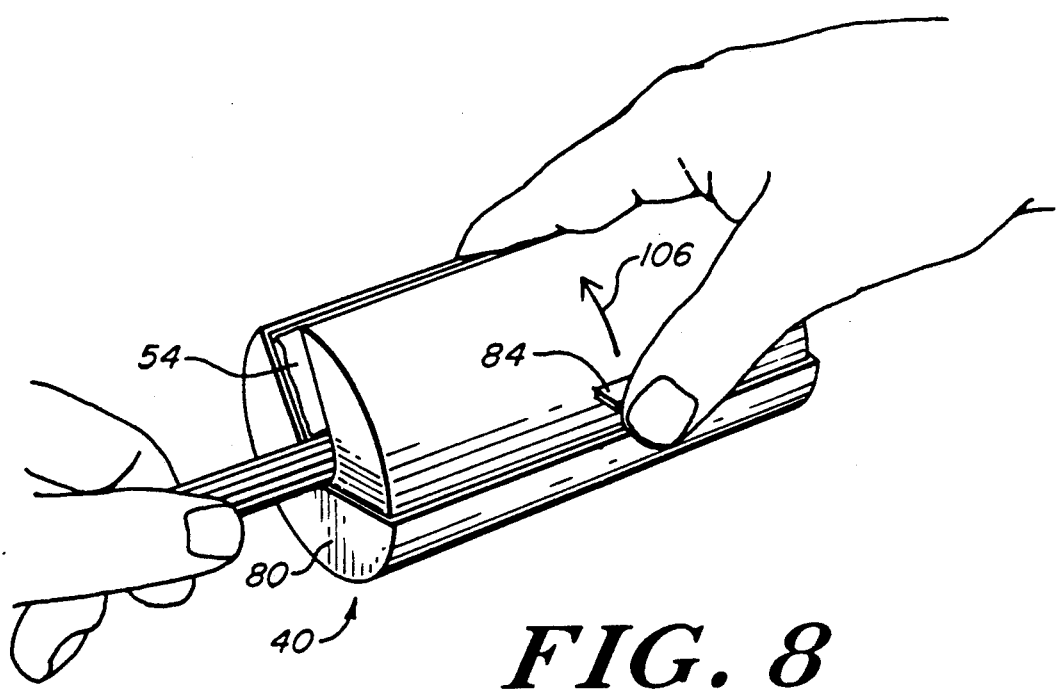
FIG. 8 is a diagrammatic illustration of the canister and cable arrangement of FIG. 7 after insertion of the insertable member, showing the rotation of a locking sleeve over top of the insertable member to lock the insertable member and the cables into the canister.
Figure 9:
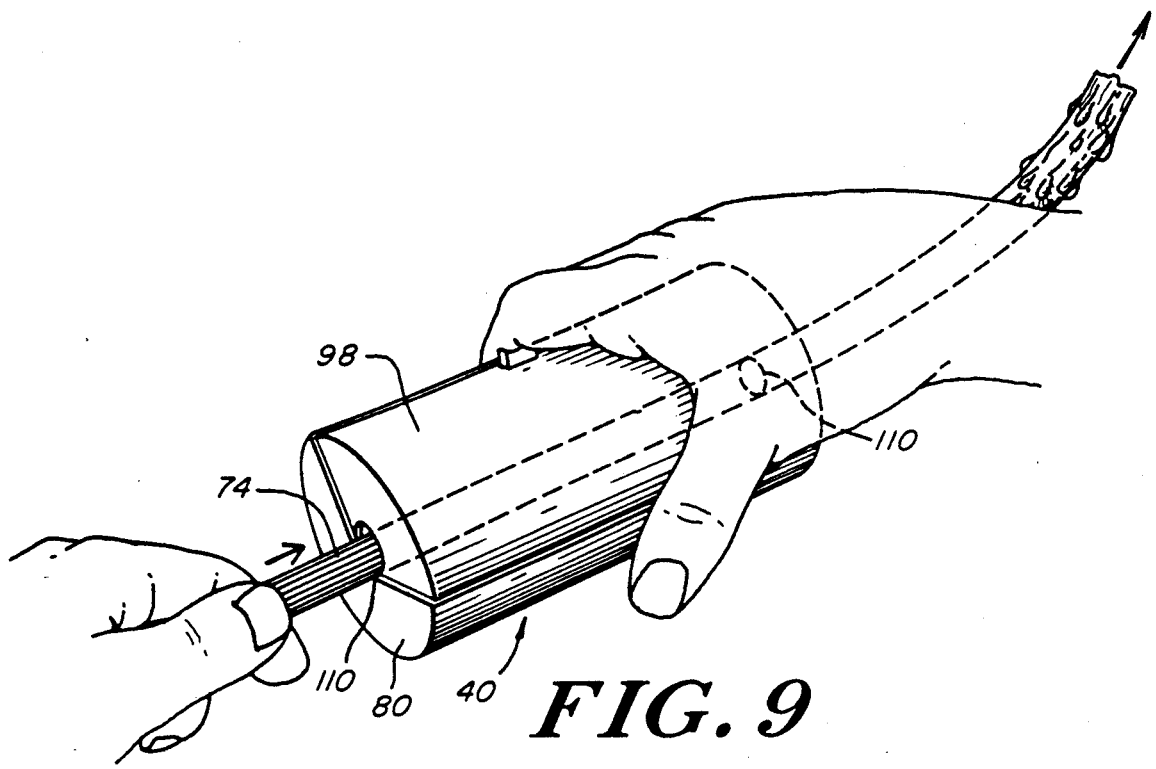
FIG. 9 is a diagrammatic illustration of the full closure of the locking sleeve so as to lock the insertable member and the cables into the canister of FIGS. 6, 7 and 8, showing the ability to push the cables through the central bore of the canister while squeezing internally-carried lubricant onto the wires.

Handle 84 is rotated as illustrated in FIG. 8 in the direction of arrow 106 so as to rotate inner sleeve 98 with respect to canister body 80, and results in the closing of the canister as illustrated in FIG. 9 such that a portion of the canister body completely overlies the insert 54 (not shown) while at the same time leaving an aperture 110 for canister 40 so that cable 74 can be pushed there-through and lubricated as illustrated.

It will be appreciated that the inner sleeve 98 with canister body 88, provides for a sealed unit such that drippage during the lubrication process is minimized.

The drippage is also minimized by virtue of the carrying of the sponge-like material within either the insert or the remainder of the canister in plastic, polyethylene bag-like structures, with apertures only along the centerline or central bore of the canister.

Figure 10A:
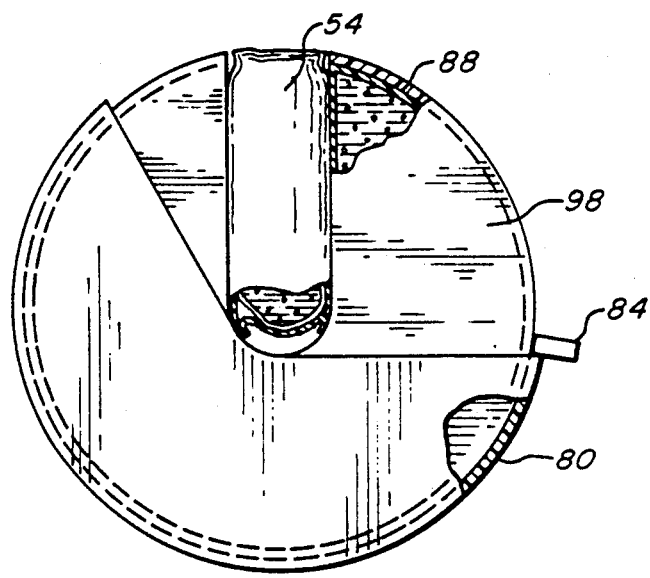
FIGS. 10A, 10B and 10C are end views and partial cross-sectional views of the subject canister illustrating the insertable member in the slot of the canister as well as the rotatable locking sleeve, also illustrating the insertion of the insertable member over wires in the slot of the canister, followed by complete rotation of the locking sleeve so as to seal the wires and the insertable member in the canister.
Figure 10B:
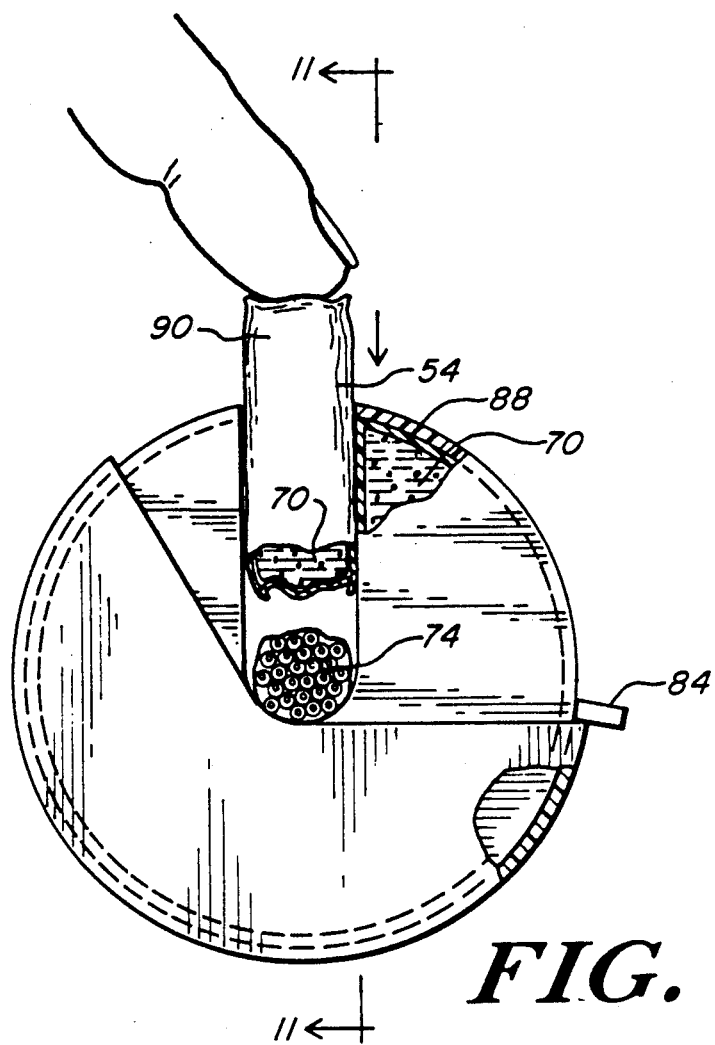
Figure 10C:
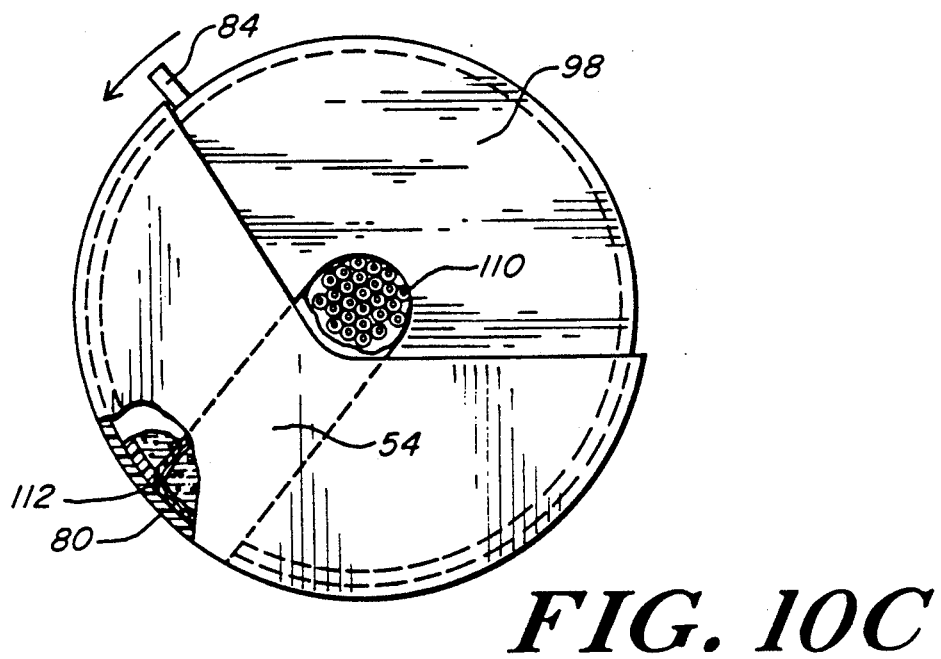

Referring now to FIG. 10A, B and C in which like members have like reference characters, it can be seen that the outer canister body 80 is co-axially located with respect to the inner slot bearing sleeve 98 which carries within it insert 54. Insert 54 is inserted as illustrated in FIG. 10B, with cable 74 located along the central bore. Here it can be seen that there is sponge-like material 70 both in the rotatable sleeve as well as in the insertable portion, with the sponge-like material being surrounded by a plastic material 90 in the case of the insert and 88 in the case of the remainder of the material. FIG. 10C shows the aforementioned closure of sleeve 98 via handle 84 so as to lock in insert 54 in the position illustrated by virtue cf canister body 80 contacting the top portion of the insert, the top portion being illustrated at 112 in FIG. 10C.

Figure 11:
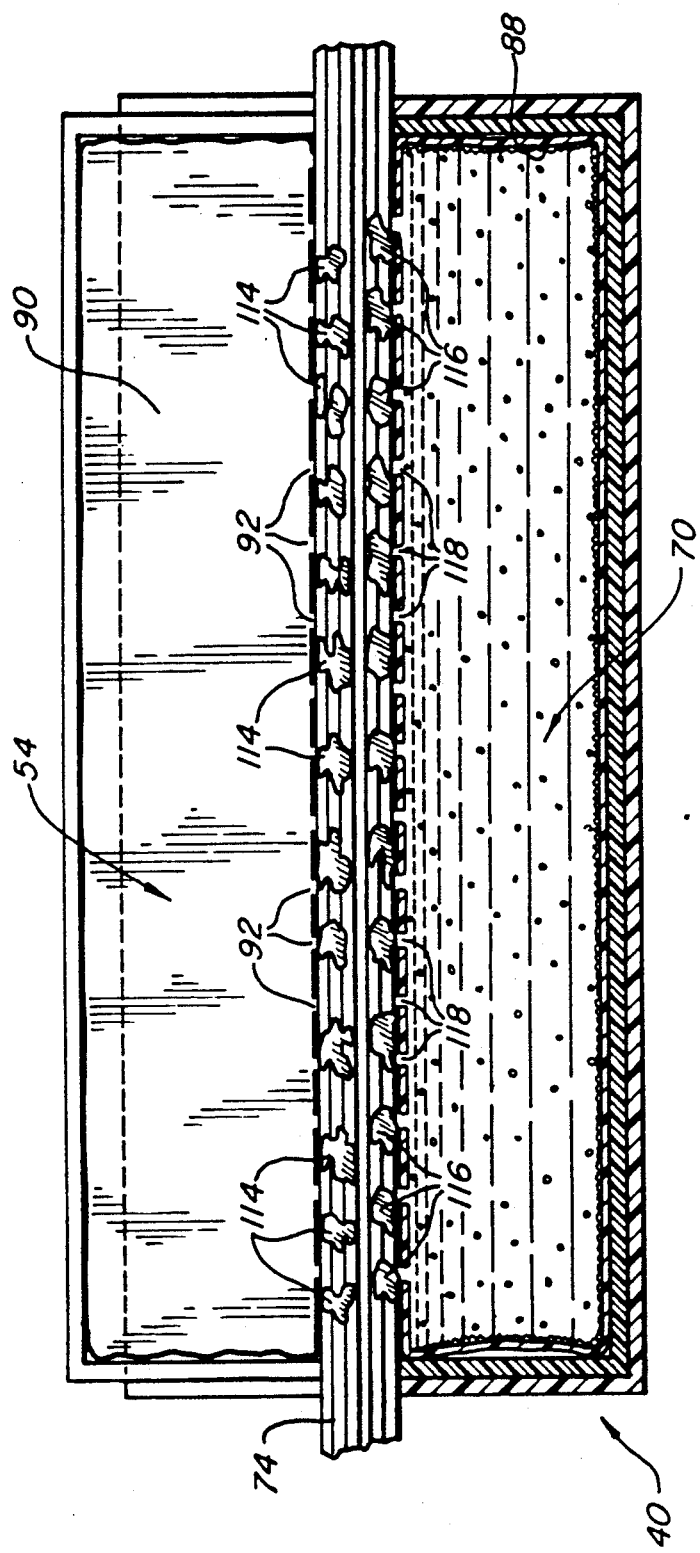
FIG. 11 is a cross-sectional and plan view of a portion of the canister illustrating the side of the insertable member as well as the sponge-like material throughout the remainder of the canister, with the lubrication coming both from the insertable member and the apertures in the bag thereof as well as from the remainder of the sponge-like material in the rest of the canister through corresponding apertures to provide 360 degree lubrication.

While apertures 110 are provided as shown, it is possible that an iris-type configuration could be utilized as an end panel for the canister. However, because of the sponge-in-the-bag structure, very little drippage occurs at these apertures and the unit may be sealed so that no lubricant or soap can come out during storage with the insert in place and no cables passing through the central bore. This is because, as illustrated in FIG. 11, the plastic material 90 of the insert is positioned against the plastic bag for the rest of the sponge-like material, absent any wires in the central bore. Note that the insert only has apertures 92 at the central bore of canister 40 such that lubricant 114 is applied to cable 74 via central apertures 118 in the bag containing the sponge-like material 70 which makes up the remainder of the material within the canister.

Figure 12:
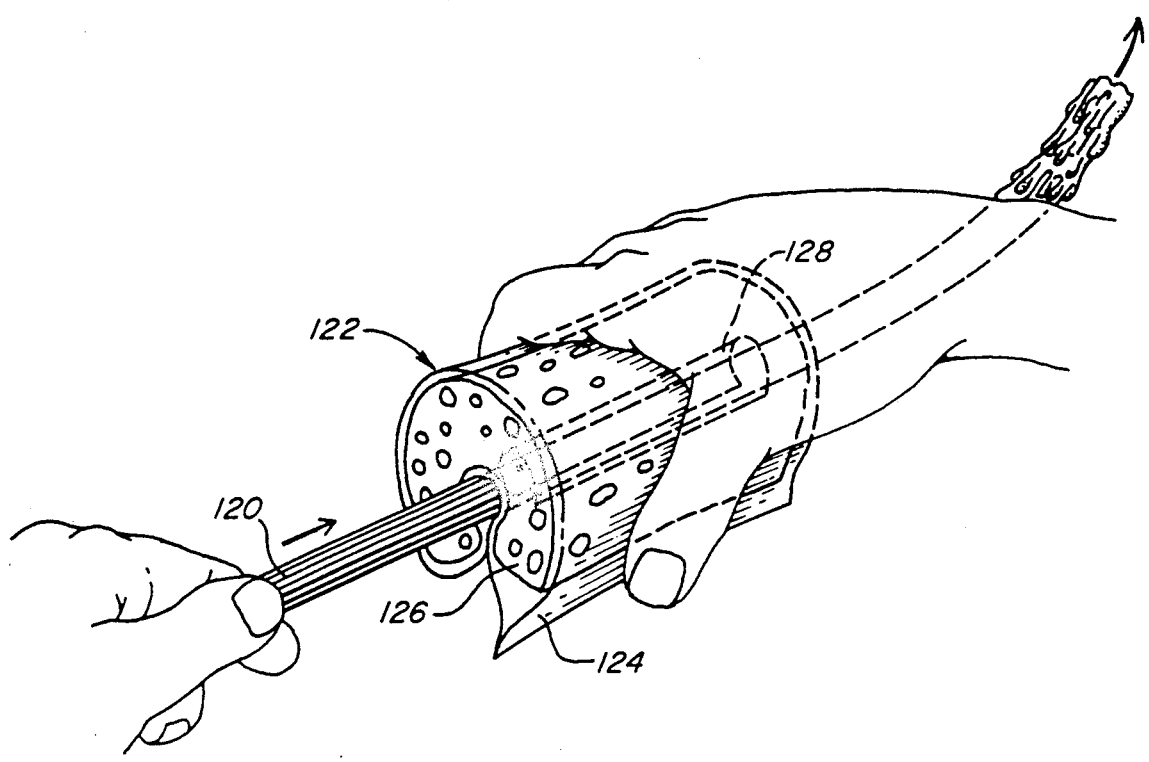
FIG. 12 is a diagrammatic representation of an additional embodiment of the invention in which an apertured bag is provided with sponge-like material which is first impregnated with soap or other lubricants, and which is wrapped around a cable manually, with the cable being pushed through the center of the bag as it is wrapped around the cable.

Referring now to FIG. 12, a cable 120 may be lubricated in one embodiment with a wrap-around sponge unit generally indicated at 122 in which a soap impervious bag 124 is provided with sponge-like material 126. One surface of the bag is provided with an aperture here illustrated by dotted line 128 such that, in use, the sponge-like material can be impregnated with soap and sealed at aperture 128. As described in FIGS. 13 and 14, in one embodiment the aperture is provided with a flap or other device for sealing.

In operation, the fully-laden sponge is exposed at the interior surface by lifting or removing the flap such that an aperture in bag 124 is exposed. This provides an avenue for the soap to be transmitted from the interiorly-held sponge to the surface of cable 120 such that lubricant is manually squeezed from the sponge-like material onto the cable.

Figure 13:
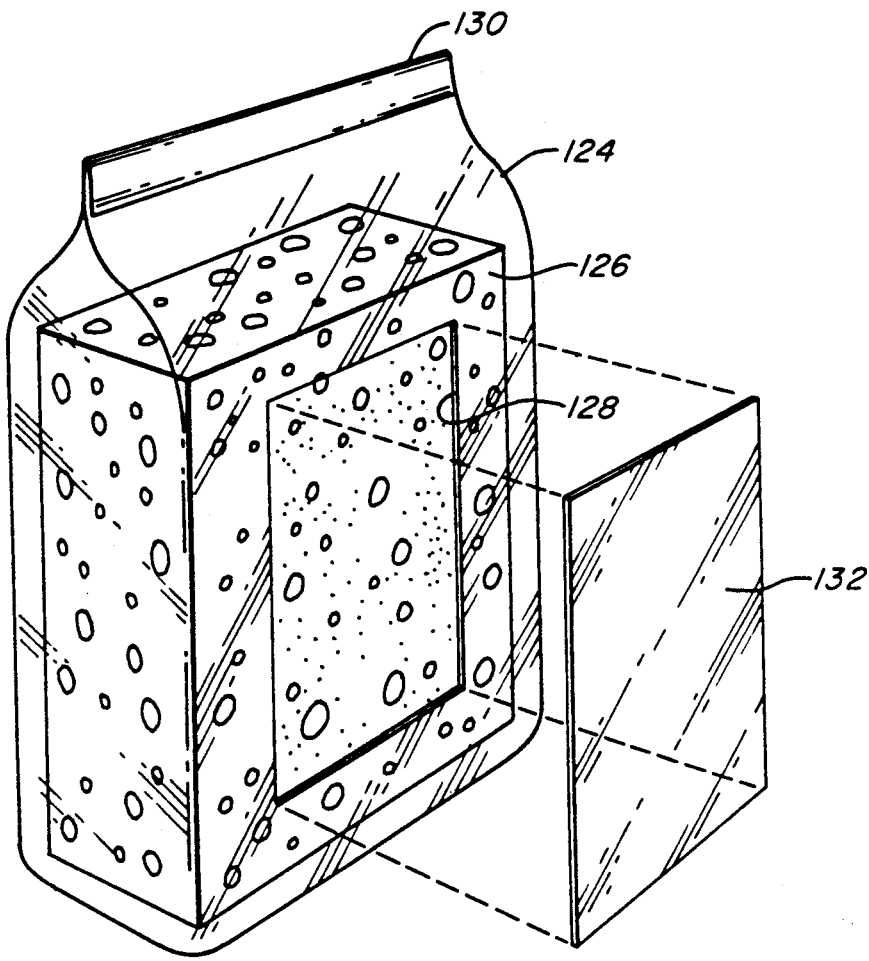
FIG. 13 is a diagrammatic representation of one embodiment of the bag of FIG. 12, illustrating the internal sponge-like structure, the aperture in one side of the bag, and a removable flap covering the aperture.

Referring to FIG. 13, bag 124 is illustrated as having sponge 126 sealed therein at a top fold 130, with bag 124 being provided with aperture 128. A removable piece or flap 132 is sealed to the edges of aperture 128 in any conventional fashion after sponge 126 has been provided with the required amount of lubricant or soap.

Figure 14:
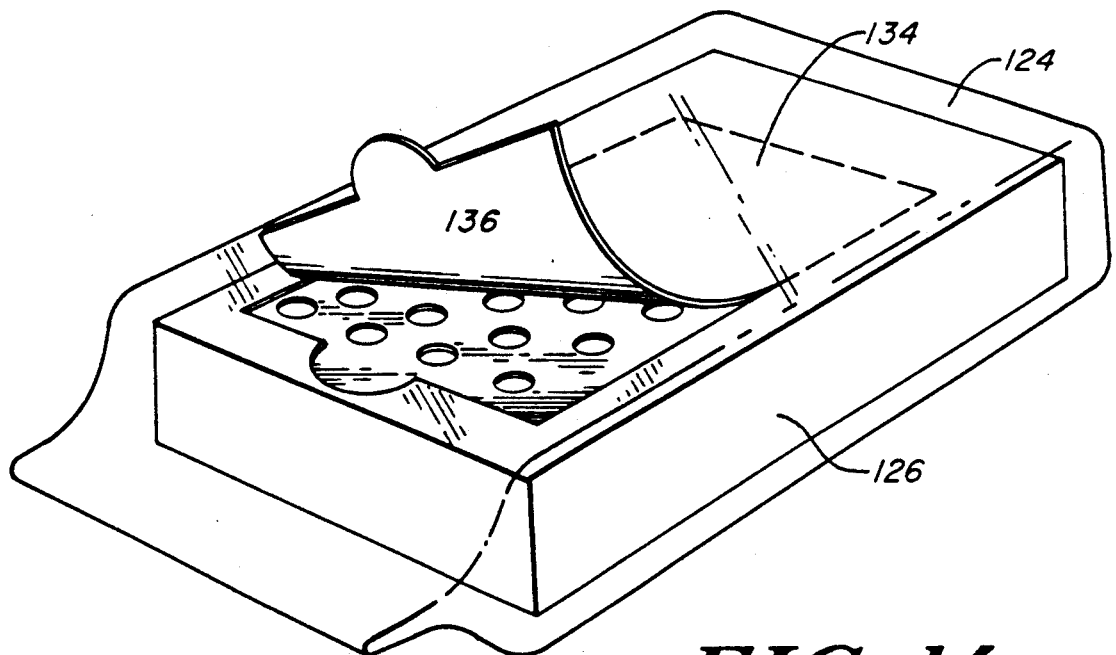
FIG. 14 is a diagrammatic illustration of another embodiment of the bag of FIG. 12, illustrating an apertured surface for the bag and a removable flap covering the apertures.

Alternatively, as illustrated in FIG. 14, bag 124 can be provided with a peelable flap 134 which exposes either the sponge material 126 directly or exposes regular apertures 136 in this surface of the bag.

In this manner an exceptionally convenient unitary bag structure is provided as a vehicle for dispensing lubricant in the form of soaP over the surface of cables and the like when the bag is wrapped around the cable and the cable is pushed through.

Having above indicated a preferred embodiment of the present invention, it will occur to those skilled in the art that modifications and alternatives can be practiced within the spirit of the invention. It is accordingly intended to define the scope of the invention only as indicated in the following claims.

I claim:

1. Apparatus for lubricating cables to be Pulled through a conduit, comprising:
   a canister having an outer body with ends, and a slot extending from an exterior surface of said canister and through a portion of each end to a longitudinal position within said canister, said ends having central openings to accommodate the passage of said cable through said canister;
   lubricant dispensing means lining said slot and adapted to dispense lubricant onto the portion of a cable in said slot as said cable is moved through said canister;
   removable insert means adapted to be placed in said slot after cables to be lubricated are placed in said slot; and
   means for sealing said canister with said insert in place, such that said canister with said lubricant dispensing means surrounds an inserted cable portion.

2. The apparatus of claim 1 wherein said longitudinal position corresponds to the center line of said canister.

3. The apparatus of claim 1 wherein said lubricant dispensing means dispenses lubrication carried therein upon squeezing of said lubricant dispensing means.

4. The apparatus of claim 3 wherein said canister is made of resilient material capable of being manually compressed, thereby to permit squeezing of said lubricant from said lubricant dispensing material.

5. The apparatus of claim 3 wherein said lubricant dispensing means includes sponge-like material and further including a lubricant impervious casing surrounding said sponge-like material, said casing having apertures along said longitudinal position.

6. The apparatus of claim 1 wherein said insert means contains said lubricant dispensing material and wherein said insert means extends only partway into said slot, thereby to define a bore through said canister.

7. The apparatus of claim 6 wherein said insert means further includes a lubricant impervious casing having apertures along said bore.

8. The apparatus of claim 2 wherein said canister includes concentrally located shell portions, with the inner shell portion adapted to rotate around the centerline of said canister, said inner shell portion adapted to rotate over said slot and insert and to clamp said insert into said canister while at the same time sealing any inserted cable into said slot for prohibiting leakage of said lubricant from said canister.

9. The apparatus of claim 8 wherein the outer shell portion includes partially completed circular end pieces, each having a central aperture, the inner and outer end pieces at each end of said canister being in contacting adjacency; and, wherein said inner shell portion includes centrally-apertured partially-circular end pieces, such that when said inner shell portion is rotated to its locking position, the respective end pieces being in contacting adjacency form a completed central aperture in the respective end of said canister, thereby to form a seal about an inserted cable at each end of said canister.

10. A method for lubricating a cable to be pulled through a conduit with a soap type lubricant without spillage, comprising the steps of:
   providing a slotted soap-carrying canister having a sealable insert adapted to fit in said slot, said slot extending through the end portions of said canister, with said canister having apertured end pieces, at least a portion of which form a portion of said slot;
   inserting a portion of the cable in said slot;
   inserting and sealing said insert over said cable, with a portion of said cable extending from each end of said canister; and
   pushing said cable through said canister, thereby to apply soap-type lubricant to the cable portions emerging from said canister.

11. The method of claim 10 wherein said canister contains resilient sponge-like lubricant-bearing material.

12. The method of claim 11 wherein said canister is resilient and further including the step of squeezing said canister so as to express said lubricant onto the cables passing through said canister.

13. A method for lubricating a cable to be pulled through a conduit with lubricant so as to facilitate passage of the cable through the conduit comprising the steps of
   at least partially surrounding a portion of the cable with a flexible resilient bag containing sponge-like material bearing lubricant said bag having lubricant dispensing apertures positioned to disperse lubricant onto the cable; and
   pushing the cable through said bag, whereby lubricant is applied to the cable without spillage.

14. Apparatus for lubricating a cable to be pulled through a conduit comprising
   an apertured lubricant impervious bag; sufficiently flexible and resilient to permit said bag to surround said cable for complete circumferential lubrication thereof with said apertures positioned on a side of said bag surrounding said cable; and
   lubricant impregnated sponge-like material in said bag.

* * * * *